US009070931B2

(12) United States Patent
Song et al.

(10) Patent No.: US 9,070,931 B2
(45) Date of Patent: Jun. 30, 2015

(54) CATHODE, METHOD OF PREPARING THE SAME, AND LITHIUM BATTERY INCLUDING THE CATHODE

(75) Inventors: Min-sang Song, Seongnam-si (KR); Han-su Kim, Seoul (KR); Jae-man Choi, Hwaseong-si (KR); Moon-seok Kwon, Hwaseong-si (KR); Un-gyu Paik, Seoul (KR); Tae-seup Song, Seoul (KR)

(73) Assignees: SAMSUNG ELECTRONICS CO., LTD. (KR); INDUSTRY-UNIVERSITY COOPERATION FOUNDATION HANYANG UNIVERSITY (KR)

( * ) Notice: Subject to any disclaimer, the term of this patent is extended or adjusted under 35 U.S.C. 154(b) by 955 days.

(21) Appl. No.: 13/197,107

(22) Filed: Aug. 3, 2011

(65) Prior Publication Data

US 2012/0082877 A1    Apr. 5, 2012

(30) Foreign Application Priority Data

Oct. 1, 2010  (KR) .......................... 10-2010-0095965

(51) Int. Cl.
*H01M 4/1315*    (2010.01)
*H01M 4/13915*   (2010.01)
(Continued)

(52) U.S. Cl.
CPC ........ *H01M 4/1315* (2013.01); *H01M 4/13915* (2013.01); *H01M 4/366* (2013.01); *H01M 4/505* (2013.01); *H01M 4/624* (2013.01); *H01M 10/0525* (2013.01); *Y02T 10/7011* (2013.01); *Y02E 60/122* (2013.01); *C01G 53/54* (2013.01); *C01P 2002/32* (2013.01); *C01P 2002/50* (2013.01); *C01P 2002/72* (2013.01);
(Continued)

(58) Field of Classification Search
CPC .......... H01M 4/1315; H01M 4/13915; H01M 4/366; H01M 4/505; H01M 4/624; H01M 10/0525; Y02E 60/122; Y02T 10/7011; C01P 2004/62; C01P 2004/64
USPC .................. 429/231.1, 232, 217, 231.3, 129; 427/126.3, 126.6
See application file for complete search history.

(56) References Cited

U.S. PATENT DOCUMENTS

| 6,818,352 B2 * | 11/2004 | Daido et al. ............. 429/231.95 |
| 2008/0090149 A1 | 4/2008 | Sano et al. |

(Continued)

FOREIGN PATENT DOCUMENTS

| JP | 8-213014 | | 8/1996 |
| JP | 2004-192896 | * | 7/2004 |

(Continued)

OTHER PUBLICATIONS

European Search Report dated Jan. 30, 2012, issued in corresponding European Patent Application No. 11183689.6-1227.
(Continued)

*Primary Examiner* — Laura Weiner
(74) *Attorney, Agent, or Firm* — Cantor Colburn LLP

(57) ABSTRACT

A cathode, a method of forming the cathode and a lithium battery including the cathode. The cathode includes a current collector and a cathode active material layer disposed on the current collector; the cathode active material layer includes a lithium transition metal oxide having a spinel structure, a conductive agent, and a binder; and at least a portion of a surface of the cathode active material layer is fluorinated.

15 Claims, 3 Drawing Sheets

(51) Int. Cl.
- *H01M 4/36* (2006.01)
- *H01M 4/505* (2010.01)
- *H01M 4/62* (2006.01)
- *C01G 53/00* (2006.01)
- *B82Y 30/00* (2011.01)
- *H01M 10/0525* (2010.01)

(52) U.S. Cl.
CPC ......... *C01P2002/85* (2013.01); *C01P 2004/62* (2013.01); *C01P 2004/64* (2013.01); *C01P 2006/40* (2013.01); *B82Y 30/00* (2013.01)

(56) References Cited

U.S. PATENT DOCUMENTS

2009/0278082 A1  11/2009  Takebayashi et al.
2009/0286157 A1  11/2009  Chen et al.

FOREIGN PATENT DOCUMENTS

| | | |
|---|---|---|
| JP | 2005-011688 | 1/2005 |
| JP | 4193481 | 10/2008 |
| JP | 2009-110952 | 5/2009 |
| KR | 10-0874539 B1 | 12/2008 |

OTHER PUBLICATIONS

Forest T. Quinlan et al.: "Surface Characterization of the Spinel $Li_xMn_2O_4$ Cathode before and after Storage at Elevated Temperatures", Chemistry of Materials, vol. 13, No. 11, Nov. 1, 2001, pp. 4207-4212.

Chuan Wu et al.: "Modification of spinel $LiMn_2O_4$ using an electrochemical method", Nov. 4, 2000, World Scientific Publishing Co. Pte. Ltd., Singapore, pp. 267-270.

Korean Office Action with English Translation for Application No. 10-2010-0095965 dated May 23, 2012.

English-language abstract of 2004-192896 from Patent Abstracts of Japan.

\* cited by examiner

CATHODE, METHOD OF PREPARING THE SAME, AND LITHIUM BATTERY INCLUDING THE CATHODE

CROSS-REFERENCE TO RELATED APPLICATIONS

This application claims the benefit of Korean Patent Application No. 10-2010-0095965, filed on Oct. 1, 2010 in the Korean Intellectual Property Office, the disclosure of which is incorporated herein by reference.

BACKGROUND

1. Field

Aspects of the present disclosure relate to cathodes, methods of preparing the same, and lithium batteries including the cathodes.

2. Description of the Related Art

For use in various small and high-performing devices, lithium batteries are required to have a high energy density, small volume and light-weight characteristics. In addition, for use in electric vehicles, cycle characteristics of a lithium battery at room temperature and at high temperatures need to be regarded as critical factors.

To realize a lithium battery satisfying the characteristics described above, various cathode active materials having a spinel structure are being reviewed. However, at a high-voltage of 4.6 V or greater, a side reaction occurs between cathode active materials having a spinel structure and an electrolyte. Due to the side reaction, initial charge and discharge efficiency and lifetime characteristics of a battery may be decreased.

In addition, release of a transition metal from cathode active materials having a spinel structure at high temperatures may lead to low charge and discharge efficiency and poor high-temperature lifetime characteristics of a battery. Accordingly, there is a need to develop a method in which the side reaction and the release of a transition metal are suppressed.

SUMMARY

Cathodes are provided for suppressing a side reaction with an electrolyte at high voltages and release of a transition metal at high temperatures.

Lithium batteries including the cathodes are also provided.

Methods of preparing the cathodes are also provided.

According to an aspect of the present invention, a cathode includes a current collector and a cathode active material layer disposed on the current collector; the cathode active material layer includes a lithium transition metal oxide having a spinel structure, a conductive agent, and a binder; and at least a portion of a surface of the cathode active material layer is fluorinated.

According to another aspect of the present invention, a lithium battery includes the cathode.

According to another aspect of the present invention, a method of forming a cathode includes forming a cathode active material layer on a current collector and fluorinating a surface of the cathode active material layer, where the cathode active material layer has a lithium transition metal oxide having a spinel structure, a conductive agent, and a binder.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Figure 1:
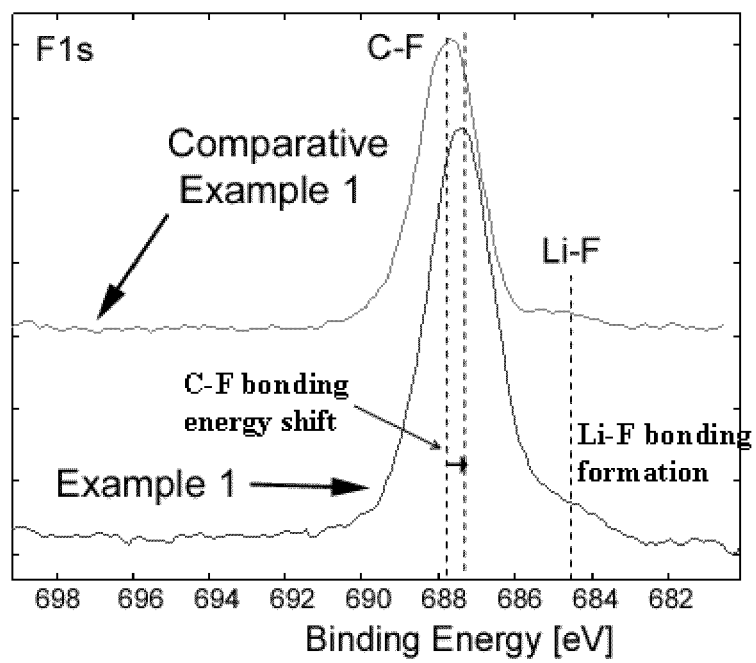
FIG. 1 shows X-ray photoelectron spectroscopy (XPS) test results of surfaces of cathodes prepared according to Example 1 and Comparative Example 1.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, cathodes, methods of preparing the same, and lithium batteries including the cathodes according to exemplary embodiments of the present invention will be described in detail.

A cathode according to an embodiment of the present invention includes a current collector and a cathode active material layer disposed on the current collector, in which the cathode active material layer has a lithium transition metal oxide having a spinel structure, a conductive agent, and a binder, and at least a portion of a surface of the cathode active material layer is fluorinated. That is, a coating layer including fluorine atoms may form either on a portion of the surface of the cathode active material layer or over the entire surface of the cathode active material layer.

Either a portion of the surface or the entire surface of the cathode active material layer is bonded to fluorine atoms to form a protective layer formed of fluorine atoms. The protective layer may prevent a side reaction with an electrolyte. Also, the fluorinated protective layer may prevent release of a transition metal from the lithium transition metal oxide having a spinel structure.

In the cathode, surfaces of the lithium transition metal oxide having a spinel structure and the conductive agent may be fluorinated. For example, lithium atoms, carbon atoms, and metallic atoms present at the surface of the cathode active material layer may be chemically bonded to fluorine atoms. Since the surface of the conductive agent is also fluorinated, a side reaction with an electrolyte may be further suppressed.

In the cathode, the lithium transition metal oxide having a spinel structure may be represented by Formula 1:

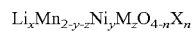

$$Li_xMn_{2-y-z}Ni_yM_zO_{4-n}X_n \qquad \text{<Formula 1>}$$

where $0.25 \leq x \leq 1.1$, $0.3 \leq y \leq 0.5$, $0 \leq z \leq 0.15$, and $0 \leq n \leq 1$; M includes one or more elements selected from the group consisting of gallium (Ga), zirconium (Zr), niobium (Nb), molybdenum (Mo), tungsten (W), barium (Ba), calcium (Ca), strontium (Sr), lanthanum (La), cerium (Ce), silver (Ag), tantalum (Ta), hafnium (Hf), ruthenium (Ru), bismuth (Bi), antimony (Sb), tin (Sn), and arsenic (As); and X includes one or more elements selected from the group consisting of fluorine (F), chlorine (Cl), bromine (Br), and iodine (I). For example, the lithium transition metal oxide having a spinel structure may be $LiNi_{0.5}Mn_{1.5}O_4$.

Further, for another example, the lithium transition metal oxide having a spinel structure may be $LiNiVO_4$, $LiCoPO_4$, $LiCoMnO_4$, $LiNiM_3O_8$, and the like.

In the cathode, an average working potential of the lithium transition metal oxide having a spinel structure may be equal to or greater than 4.6 V. For example, the average working potential of the lithium transition metal oxide having a spinel structure may be in a range of about 4.6 to about 4.95 V.

The term 'average working potential' used herein refers to a value given by dividing electric power during charging and discharging by current during charging and discharging when a battery is charged and discharged between upper and lower limits of a certain charge and discharge potential.

In the cathode, an average diameter of the lithium transition metal oxide having a spinel structure may be in a range of about 20 nm to about 10 μm. Within the average diameter range, a lithium battery including the cathode may have good charge and discharge efficiency and lifetime characteristics.

In the cathode, the conductive agent may include one or more elements selected from the group consisting of carbon black, graphite particles, natural graphite, artificial graphite, hard carbon, acetylene black, ketjen black, carbon fibers, carbon nanotubes, graphene, metal powder, metal fibers, metal tubes, and a conductive polymer. However, the conductive agent may not be limited thereto. For example, any one of various conductive agents that have a surface capable of being substituted with fluorine atoms may be used as the conductive agent.

In the cathode, an average particle diameter of the conductive agent may be in a range of about 5 nm to about 500 nm. Within the average particle diameter range, the lithium battery may have good charge and discharge efficiency and lifetime characteristics.

In the cathode, the surface of the cathode active material layer may be completely covered with fluorine atoms. That is, all portions of the surface of the cathode active material layer that may contact an electrolyte may be covered with fluorine atoms.

In the cathode, the surface of the cathode may show a peak corresponding to Li—F bonding in X-ray photoelectron spectroscopy (XPS). The binding energy of a peak corresponding to the Li—F bonding may be 684 eV~685 eV. Further, C—F bonding energy peak of the cathode of the present invention may shift to lower energy region by 0.2 eV~0.6 eV in X-ray photoelectron spectroscopy (XPS) in comparison with the C—F peak of the cathode not fluorinated. In other words, C—F bonding energy peak of the cathode of the present invention may be 687.7 eV~687.3 eV in X-ray photoelectron spectroscopy (XPS). Further, since the surface of the fluorinated cathode is already saturated with fluorine atoms, additional shift of the C—F peak to lower energy region cannot be obtained by any further fluorine treatment.

A method of preparing a cathode according to an embodiment of the present invention includes forming a cathode active material layer on a current collector; and fluorinating a surface of the cathode active material layer, in which the cathode active material layer has a lithium transition metal oxide having a spinel structure, a conductive agent, and a binder.

In the method, the fluorinating may be performed by contacting the surface of the cathode active material layer with either $F_2$ gas or a mixed gas including $F_2$ gas and an inert gas such as Ar gas.

In the cathode, the fluorinating may be performed at a temperature of about 0 to about 100° C. For example, the fluorinating may be performed at about 10 to about 40° C. For example, the fluorinating may be performed at room temperature.

If the fluorination temperature is higher than 100° C., the binder may deteriorate, and thus the electrode binding force may be weakened. Also, the binding force between the cathode active material layer including the cathode active material, the conductive agent, and the binder and the current collector may be decreased, and thus the cathode active material layer and the conductive agent may separate from the current collector.

In the method, the fluorinating may be performed by supplying a fluorine atom-containing gas at a flow rate of about 100 to about 10000 sccm (standard cubic centimeter per minutes) for about 30 to about 300 minutes. When the fluorine atom-containing gas is supplied for the gas supply time range described above, the lithium battery may have a good capacity retention rate and good lifetime characteristics.

In the method, the lithium transition metal oxide having a spinel structure may be represented by Formula 1:

   <Formula 1> where $0.25 \leq x \leq 1.1$, $0.3 \leq y \leq 0.5$, $0 \leq z \leq 0.15$, and $0 \leq n \leq 1$; M includes one or more elements selected from the group consisting of Ga, Zr, Nb, Mo, W, Ba, Ca, Sr, La, Ce, Ag, Ta, Hf, Ru, Bi, Sb, Sn, and As; and X includes one or more elements selected from the group consisting of F, Cl, Br, and I. For example, the lithium transition metal oxide having a spinel structure may be $LiNi_{0.5}Mn_{1.5}O_4$.

In the method, the conductive agent may include one or more elements selected from the group consisting of carbon black, graphite particles, natural graphite, artificial graphite, acetylene black, ketjen black, carbon fibers, carbon nanotubes, metal powder, metal fibers, metal tubes, and a conductive polymer. However, the conductive agent may not be limited thereto. For example, any one of various conductive agents that have a surface capable of being substituted with fluorine atoms may be used as the conductive agent.

An example of the method of preparing the cathode will now be described in detail. First, a lithium transition metal oxide having a spinel structure, a conductive agent, a binder, and a solvent are mixed to prepare a cathode active material composition. The cathode active material composition may be directly coated on an aluminum current collector and dried to form a cathode plate including a cathode active material layer. Alternatively, the cathode active material composition may be cast on a separate support and separated from the support as a film and then the film is laminated on an aluminum current collector to form the cathode plate including the cathode active material layer.

Then, $F_2$ gas is supplied to the cathode plate at a flow rate of about 1000 to about 3000 sccm and at a temperature of about 0 to about 100° C. for about 30 to 300 minutes, thereby fluorinating a surface of the cathode active material layer. Due to the fluorination treatment, surfaces of the lithium transition metal oxide having a spinel structure and the conductive agent may be fluorinated.

The conductive agent may be carbon black; graphite particles; natural graphite; artificial graphite; hard carbon; acetylene black; ketjen black; carbon fibers; carbon nanotubes; graphene; powder, fibers, or tubes of copper, nickel, aluminum, or silver; or a conductive polymer such as a polyphenylene derivative.

The binder may be a vinylidene fluoride/hexafluoropropylene copolymer; polyvinylidenefluoride, polyacrylonitrile, polymethylmethacrylate, polytetrafluoroethylene, or a mixture thereof; or a styrene butadiene rubber-based polymer.

The solvent may be N-methylpyrrolidone (NMP), acetone, or water. Amounts of the cathode active material, the conductive agent, the binder, and the solvent used herein may be used at the same levels as used in a traditional lithium battery.

A lithium battery according to an embodiment of the present invention includes the cathode. An example of a method of manufacturing the lithium battery will now be described in detail.

First, a cathode is prepared as described above. Then, as in the cathode plate preparation method, an anode active material, a conductive agent, a binder, and a solvent are mixed to prepare an anode active material composition, and the anode active material composition is directly coated on a copper current collector, thereby completing manufacturing of an anode plate. Alternatively, the anode active material composition is cast on a separate support and separated from the support as an anode active material film and then the anode active material film is laminated on a copper current collector, thereby completing manufacturing of an anode plate.

The anode active material may not be particularly limited as long as it is conventionally used in the art. Examples of the anode active material are lithium metal, a metal that is alloyable with lithium, a transition metal oxide, a material that is used to dope or undope lithium, and a material that enables reversible intercalation and deintercalation of lithium ions.

Examples of the transition metal oxide are tungsten oxide, molybdenum oxide, titanium oxide, lithium titanium oxide, vanadium oxide, and lithium vanadium oxide. Examples of the material that is used to dope or undope lithium are silicon (Si), $SiO_x$ (0<x<2), Si-Q alloy (Q may be an alkali metal, an alkali earth metal, a Group 13 element, a Group 14 element, a transition metal, a rare-earth element, or a combination thereof, and may not be Si), Sn, $SnO_2$, and Sn—R (R may be an alkali metal, an alkali earth metal, a Group 13 element, a Group 14 element, a transition metal, a rare-earth element, or a combination thereof, and may not be Si), and at least one of these may be used in combination with $SiO_2$ for use as the anode active material. The elements Q or R may be magnesium (Mg), calcium (Ca), strontium (Sr), barium (Ba), scandium (Sc), yttrium (Y), titanium (Ti), zirconium (Zr), hafnium (Hf), vanadium (V), niobium (Nb), tantalum (Ta), chromium (Cr), molybdenum (Mo), tungsten (W), rhenium (Re), iron (Fe), lead (Pb), ruthenium (Ru), osmium (Os), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), or a combination thereof.

The material that enables reversible intercalation and deintercalation of lithium ions may be any one of various carbonaceous anode active materials that are conventionally used in a lithium battery. Examples of the material that enables reversible intercalation and deintercalation of lithium ions are crystalline carbon, amorphous carbon, and a mixture thereof. Examples of crystalline carbon are plate, flake, spherical, or fiber-type natural graphite, and artificial graphite; and examples of amorphous carbon are soft carbon (low-temperature calcined carbon), hard carbon, mesophase pitch carbide, and calcined coke.

The conductive agent, the binder, and the solvent of the anode active material composition may be the same as in a cathode. In another embodiment, each of the cathode active material composition and the anode active material composition may further include a plasticizer to form pores in the cathode or anode plate.

Amounts of the anode active material, the conductive agent, the binder, and the solvent used herein may be used at the same levels as used in a traditional lithium battery. According to the purpose and structure of a particular lithium battery, one or more of the conductive agent, the binder, and the solvent may not be used.

Then, a separator that is to be interposed between the cathode and the anode is prepared. The separator may be any one of various separators conventionally used in a lithium battery. The separator may have a low resistance to ion flow and a high electrolytic solution-retaining capability. Examples of the separator are glass fiber, polyester, polyethylene (PE), polypropylene, polytetrafluoroethylene (PTFE), and a combination thereof, and these separators may be in a non-woven or woven fabric form. For example, a separator suitable for a lithium ion battery may be a rollable separator formed of, for example, polyethylene or polypropylene, and a separator suitable for a lithium ion polymer battery may be a separator that has an excellent organic electrolytic solution-retaining capability. An example of a method of forming the separator will now be described in detail.

A polymer resin, a filler, and a solvent are mixed to prepare a separator composition. The separator composition may be directly coated on an electrode and dried to form a separator. Alternatively, the separator composition may be cast on a support, dried, and then separated from the support as a separator film and then the separator film may be laminated on an electrode, thereby forming a separator.

The polymer resin used in forming the separator may not be particularly limited and may be any one of various materials that are used as a binder of an electrode plate. Examples of the polymer are a vinylidenefluoride/hexafluoropropylene copolymer, polyvinylidenefluoride (PVDF), polyacrylonitrile, polymethylmethacrylate, and a mixture thereof.

Then, an electrolyte is prepared. The electrolyte may be an organic electrolytic solution. In addition, the electrolyte may instead be solid. Examples of the solid electrolyte are boron oxide and lithium oxynitride, but are not limited thereto. The solid electrolyte may be any one of various solid electrolytes used in the art. The solid electrolyte may be formed on the anode by, for example, sputtering.

For example, an organic electrolytic solution may be used as the electrolyte. The organic electrolytic solution may be prepared by dissolving a lithium salt in an organic solvent.

The organic solvent may be any one of various organic solvents used in the art. Examples of the organic solvent are propylene carbonate, ethylene carbonate, fluoroethylene carbonate, butylene carbonate, dimethyl carbonate, diethyl carbonate, ethyl methyl carbonate, methyl propyl carbonate, ethylpropyl carbonate, methyl isopropylcarbonate, dipropyl carbonate, dibutyl carbonate, benzonitrile, acetonitrile, tetrahydrofuran, 2-methyltetrahydrofuran, γ-butyrolactone, 1,3-dioxolane, 4-methyl-1,3-dioxolane, N,N-dimethyl formamide, dimethylacetamide, dimethylsulfoxide, dioxane, 1,2-dimethoxyethane, sulfolane, dichloroethane, chlorobenzene, nitrobenzene, diethyleneglycol, dimethyl ether, and a mixture thereof.

The lithium salt may be any one of various lithium salts used in the art. Examples of the lithium salt are $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (each of x and y is a natural number), LiCl, LiI, and a mixture thereof.

Figure 4:
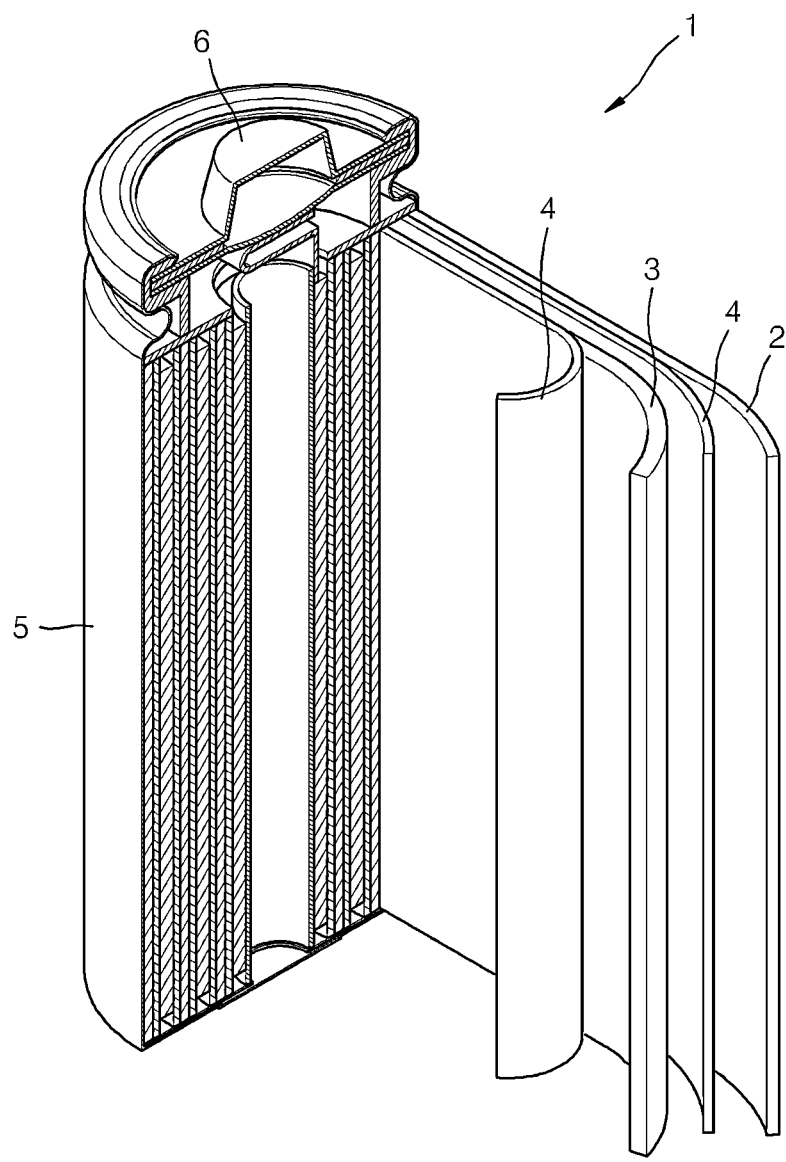
FIG. 4 is a schematic view of a lithium battery according to an embodiment of the present invention.

Referring to FIG. 4, a lithium battery 1 includes a cathode 3, an anode 2, and a separator 4. The cathode 3, the anode 2, and the separator 4 are wound or folded to be housed in a battery case 5. Then, an organic electrolytic solution is injected into the battery case 5 and the resultant structure is sealed with a cap assembly 6, thereby completing manufacturing of the lithium battery 1. The battery case may have a cylindrical, rectangular, or thin-film form. For example, the lithium battery 1 may be a large thin-film type battery. In another embodiment, the lithium battery 1 may be a lithium ion battery.

Meanwhile, a battery assembly may be formed by interposing the separator between the cathode and the anode. A plurality of the battery assemblies may be stacked in a bi-cell structure, and then impregnated with an organic electrolytic solution, and the resultant structure is housed in a pouch and sealed, thereby completing manufacturing of a lithium ion polymer battery.

In addition, the battery assemblies may be stacked on each other to form a battery pack, and the battery pack may be used in high-capacity and high-performance devices, such as a notebook computer, a smart phone, an electric vehicle (EV), etc.

Since the lithium battery has good charge and discharge efficiency characteristics and lifetime characteristics at high temperatures, the lithium battery is suitable for use in an EV. For another example, the lithium battery may be used in a hybrid vehicle such as a plug-in hybrid electric vehicle (PHEV).

One or more embodiments will now be described in further detail with reference to the following examples. These examples are for illustrative purpose only and are not intended to limit the scope of the one or more embodiments.

Preparation of Cathode

Example 1

A mixture including $LiNi_{0.5}Mn_{1.5}O_4$ having an average diameter of 1000 nm, a carbon conductive agent (SUPER P® Li, Timcal Corp.), and polyvinylidenefluoride (PVdF) at a weight ratio of 90:4:6 was mixed with N-methylpyrrolidone (NMP) in an agate mortar to prepare a slurry. The slurry was coated on an aluminum current collector by using a doctor blade to form a coating layer having a thickness of about 20 μm, and then the coating layer was dried at room temperature and then dried at a temperature of 120° C. under vacuum conditions, so as to prepare a cathode plate including a cathode active material layer.

The cathode plate including the cathode active material layer was placed in a chamber and then $F_2$ gas was supplied to the chamber at a temperature of 25° C. and at a flow rate of 2000 sccm for 30 minutes, thereby fluorinating a surface of the cathode active material layer.

Example 2

A cathode plate was manufactured in the same manner as in Example 1, except that $LiNiVO_4$ was used instead of $LiNi_{0.5}Mn_{1.5}O_4$.

Example 3

A cathode plate was manufactured in the same manner as in Example 1, except that $LiCoPO_4$ was used instead of $LiNi_{0.5}Mn_{1.5}O_4$.

Example 4

A cathode plate was manufactured in the same manner as in Example 1, except that $LiCoMnO_4$ was used instead of $LiNi_{0.5}Mn_{1.5}O_4$.

Example 5

A cathode plate was manufactured in the same manner as in Example 1, except that $LiNiMn_3O_8$ was used instead of $LiNi_{0.5}Mn_{1.5}O_4$.

Example 6

A cathode plate was manufactured in the same manner as in Example 1, except that carbon nanotubes were used instead of the conductive agent.

Example 7

A cathode plate was manufactured in the same manner as in Example 1, except that graphene was used instead of the conductive agent.

Example 8

A cathode plate was manufactured in the same manner as in Example 1, except that hard carbon was used instead of the conductive agent.

Example 9

A cathode plate was manufactured in the same manner as in Example 1, except that soft carbon was used instead of the conductive agent.

Comparative Example 1

A mixture including $LiNi_{0.5}Mn_{1.5}O_4$ having an average diameter of 1000 nm, a carbon conductive agent (SUPER P® Li), and polyvinylidenefluoride (PVdF) at a weight ratio of 90:4:6 was mixed with N-methylpyrrolidone (NMP) in an agate mortar to prepare a slurry. The slurry was coated on an aluminum current collector by using a doctor blade to form a coating layer having a thickness of about 20 μm, and then the coating layer was dried at room temperature and then dried at a temperature of 120° C. under vacuum conditions, so as to prepare a cathode plate including a cathode active material layer.

Comparative Example 2

A mixture including $LiNi_{0.5}Mn_{1.5}O_4$ that had a fluorinated surface and had an average diameter of 1000 nm, a carbon conductive agent (SUPER P® Li), and polyvinylidenefluoride (PVdF) at a weight ratio of 90:4:6 was mixed with N-methylpyrrolidone (NMP) in an agate mortar to prepare a slurry. The slurry was coated on an aluminum current collector by using a doctor blade to form a coating layer having a thickness of about 20 μm, and then the coating layer was dried at room temperature and then dried at a temperature of 120° C. under vacuum conditions, so as to prepare a cathode plate including a cathode active material layer.

The $LiNi_{0.5}Mn_{1.5}O_4$ having a fluorinated surface was prepared by loading $LiNi_{0.5}Mn_{1.5}O_4$ powder into a chamber and supplying $F_2$ gas to the chamber at a temperature of 25° C. and at a flow rate of 2000 sccm for 30 minutes.

Manufacturing Lithium Batteries

Example 10

A coin cell was manufactured using the cathode plate prepared according to Example 1, lithium metal as an opposite electrode, a separator formed of PE, and an electrolyte prepared by dissolving 1.0M LiPF$_6$ in a mixed solution including ethylene carbonate (EC) and dimethyl carbonate (DMC) in a volumetric ratio of 1:1.

Example 11

A coin cell was manufactured in the same manner as in Example 10, except that the cathode plate prepared according to Example 2 was used instead of the cathode plate prepared according to Example 1.

Example 12

A coin cell was manufactured in the same manner as in Example 10, except that the cathode plate prepared according to Example 3 was used instead of the cathode plate prepared according to Example 1.

Example 13

A coin cell was manufactured in the same manner as in Example 10, except that the cathode plate prepared according to Example 4 was used instead of the cathode plate prepared according to Example 1.

Example 14

A coin cell was manufactured in the same manner as in Example 10, except that the cathode plate prepared according to Example 5 was used instead of the cathode plate prepared according to Example 1.

Example 15

A coin cell was manufactured in the same manner as in Example 10, except that the cathode plate prepared according to Example 6 was used instead of the cathode plate prepared according to Example 1.

Example 16

A coin cell was manufactured in the same manner as in Example 10, except that the cathode plate prepared according to Example 7 was used instead of the cathode plate prepared according to Example 1.

Example 17

A coin cell was manufactured in the same manner as in Example 10, except that the cathode plate prepared according to Example 8 was used instead of the cathode plate prepared according to Example 1.

Example 18

A coin cell was manufactured in the same manner as in Example 10, except that the cathode plate prepared according to Example 9 was used instead of the cathode plate prepared according to Example 1.

Comparative Example 3

A coin cell was manufactured in the same manner as in Example 10, except that the cathode plate prepared according to Comparative Example 1 was used instead of the cathode plate prepared according to Example 1.

Comparative Example 4

A coin cell was manufactured in the same manner as in Example 10, except that the cathode plate prepared according to Comparative Example 2 was used instead of the cathode plate prepared according to Example 1.

Evaluation Example 1

XPS Test

Surfaces of the cathode plates prepared according to Example 1 and Comparative Example 1 were analyzed by X-ray photoelectron spectroscopy (XPS), and the results are shown in FIG. 1. As shown in FIG. 1, the binding energy of a peak corresponding to a C—F bonding of the cathode plate of Example 1 is lower than that of the cathode plate of Comparative Example 1. In addition, regarding the cathode plate of Example 1, a peak corresponding to an Li—F bonding was formed. That is, it was confirmed that lithium and carbon atoms present at a surface of the cathode active material layer are bonded to fluorine atoms since the surface of the cathode active material layer of Example 1 is fluorinated. The C—F peak of Comparative Example 1 may be derived from the binder (PVdF) including fluorine atoms.

Evaluation Example 2

Room-Temperature Charge and Discharge Test

Figure 2:
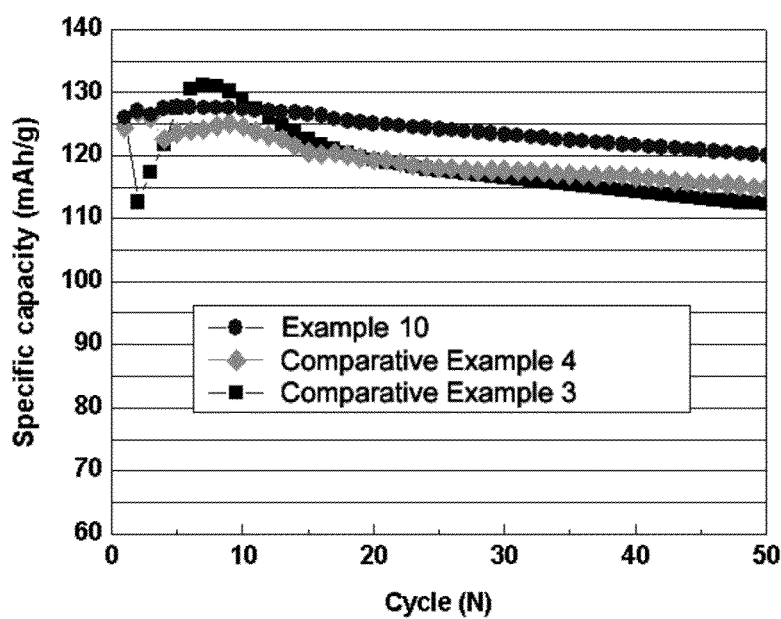
FIG. 2 shows room-temperature charge and discharge test results of lithium batteries prepared according to Example 10 and Comparative Examples 3 and 4.

The coin cells manufactured according to Example 10 and Comparative Examples 3 and 4 were charged and discharged fifty times with a constant current of 0.1 C in a voltage range of about 3.5 to about 4.9 V with respect to lithium metal at a temperature of 25° C. Initial charge and discharge efficiency and discharge capacity in the first cycle are shown in Table 1. Initial charge and discharge efficiency in the first cycle is represented by Equation 1 below. In addition, lifetime characteristics in the 50$^{th}$ cycle are shown in Table 2 below and in FIG. 2. A capacity retention rate in the 50$^{th}$ cycle is represented by Equation 2.

Initial charge and discharge efficiency[%]=discharge capacity/charge capacity <Equation 1>

Capacity retention rate in the 50$^{th}$ cycle [%]=[Discharge capacity in the 50$^{th}$ cycle]/[Discharge capacity in the first cycle]×100 <Equation 2>

TABLE 1

|  | Initial charge and discharge efficiency [%] | Charge capacity in the 50$^{th}$ cycle [mAh/g] |
| --- | --- | --- |
| Example 10 | 93.7 | 126 |
| Comparative Example 3 | 82.4 | 126 |
| Comparative Example 4 | 84.2 | 126 |

As shown in Table 1, the coin cell manufactured according to Example 10 has higher initial charge and discharge efficiency than the coin cells manufactured according to Comparative Examples 3 and 4.

TABLE 2

| | Capacity retention rate in the 50$^{th}$ cycle [%] |
|---|---|
| Example 10 | 95.2 |
| Comparative Example 3 | 89.3 |
| Comparative Example 4 | 92.3 |

As shown in Table 2 above, the coin cell manufactured according to Example 10 has better lifetime characteristics at room temperature than the coin cells manufactured according to Comparative Examples 3 and 4. In addition, although not illustrated in the drawings, the coin cell manufactured according to Example 10 has higher coulomb efficiency than the coin cells manufactured according to Comparative Examples 3 and 4 in each cycle.

Evaluation Example 3

High-Temperature Charge and Discharge Test

The coin cells manufactured according to Example 10 and Comparative Examples 3 and 4 were charged and discharged 40 times with a constant current of 1 C in a voltage range of about 3.5 to about 4.9 V with respect to lithium metal at a temperature of 60° C. Lifetime characteristics in the 40$^{th}$ cycle are shown in Table 3 below and in FIG. 3.

TABLE 3

| | Capacity retention rate in the 40$^{th}$ cycle [%] |
|---|---|
| Example 5 | 70.9 |
| Comparative Example 3 | 8.7 |
| Comparative Example 4 | 20.5 |

Figure 3:
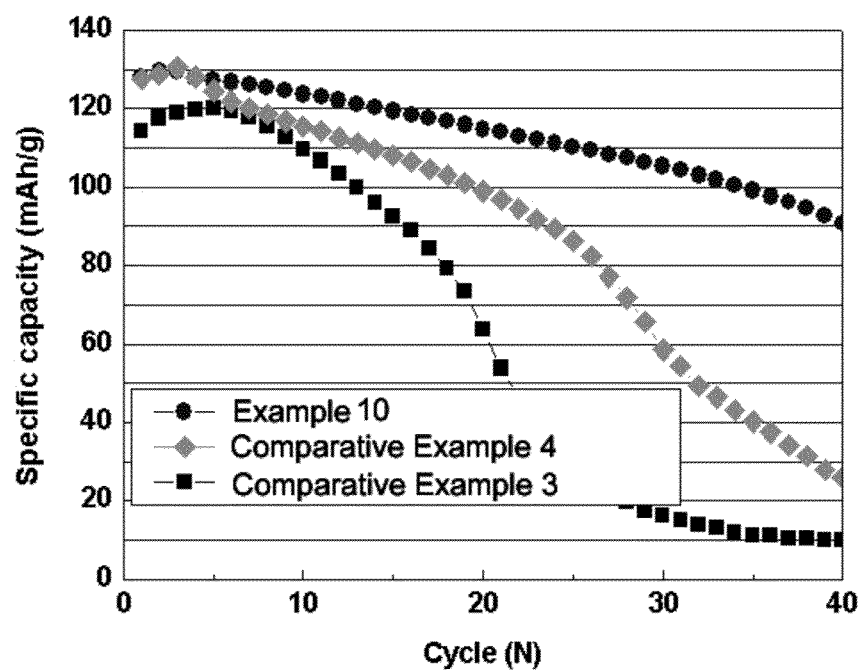
FIG. 3 shows high-temperature charge and discharge test results of lithium batteries manufactured according to Example 10 and Comparative Examples 3 and 4.

As shown in Table 3 and in FIG. 3, the coin cell manufactured according to Example 10 has better high-temperature lifetime characteristics than the coin cells manufactured according to Comparative Examples 3 and 4. In addition, although not illustrated in the drawings, the coin cell manufactured according to Example 10 has higher coulomb efficiency than the coin cells manufactured according to Comparative Examples 3 and 4 in each cycle.

As described above, according to the one or more of the above embodiments of the present invention, by fluorinating a surface of a cathode, efficiency and lifetime characteristics of a lithium battery including the cathode may be improved.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A cathode comprising: a current collector; and
a cathode active material layer disposed on the current collector,
wherein the cathode active material layer comprises a lithium transition metal oxide having a spinel structure, a conductive agent, and a binder, and
at least a portion of a surface of the cathode active material layer is fluorinated; wherein an average working potential of the lithium transition metal oxide having the spinel structure is in the range of about 4.6 V to 4.95 V.

2. The cathode of claim 1, wherein surfaces of the lithium transition metal oxide having the spinel structure and the conductive agent are fluorinated.

3. The cathode of claim 2, wherein surfaces of the lithium transition metal oxide having the spinel structure and the conductive agent are completely fluorinated.

4. The cathode of claim 2, wherein surfaces of the lithium transition metal oxide having the spinel structure or the conductive agent are partially fluorinated.

5. The cathode of claim 1, wherein the lithium transition metal oxide having the spinel structure is represented by Formula 1 below:

$$Li_xMn_{2-y-z}Ni_yM_zO_{4-n}X_n \qquad <Formula\ 1>$$

where $0.25 \leq x \leq 1.1$, $0.3 \leq y \leq 0.5$, $0 \leq z \leq 0.15$, and $0 \leq n \leq 1$, M comprises one or more elements selected from the group consisting of gallium (Ga), zirconium (Zr), niobium (Nb), molybdenum (Mo), tungsten (W), barium (Ba), calcium (Ca), strontium (Sr), lanthanum (La), cerium (Ce), silver (Ag), tantalum (Ta), hafnium (Hf), ruthenium (Ru), bismuth (Bi), antimony (Sb), tin (Sn), and arsenic (As); and X comprises one or more elements selected from the group consisting of fluorine (F), chlorine (Cl), bromine (Br), and iodine (I).

6. The cathode of claim 5, wherein the lithium transition metal oxide having the spinel structure is $LiNi_{0.5}Mn_{1.5}O_4$.

7. The cathode of claim 1, wherein the lithium transition metal oxide having a spinel structure may be $LiNiVO_4$, $LiCoPO_4$, $LiCoMnO_4$, or $LiNiM_3O_8$.

8. The cathode of claim 1, wherein an average particle size of the lithium transition metal oxide having the spinel structure is in a range of about 20 nm to about 10 μm.

9. The cathode of claim 1, wherein the conductive agent comprises at least one material selected from the group consisting of carbon black, graphite particles, natural graphite, artificial graphite, hard carbon, acetylene black, ketjen black, carbon fibers, carbon nanotubes, graphene, metal powder, metal fibers, metal tubes, and a conductive polymer.

10. The cathode of claim 1, wherein an average particle size of the conductive agent is in a range of about 5 nm to about 500 nm.

11. The cathode of claim 1, wherein the surface of the cathode active material layer is completely coated with fluorine atoms.

12. The cathode of claim 1, wherein the surface of the cathode active material layer is partially coated with fluorine atoms.

13. The cathode of claim 12, wherein the surface of the cathode active material layer is coated with fluorine atoms.

14. A lithium battery comprising the cathode of claim 1.

15. A lithium battery comprising:
a cathode incorporating a current collector and a cathode active material layer disposed on the current collector;
an anode;
a separator separating the cathode and the anode;
a battery case incorporating the cathode, anode, and separator;
an organic electrolyte; and
a cap assembly, wherein:
the cathode active material layer further comprises a lithium transition metal oxide having a spinel structure, a conductive agent, and a binder, at least a portion of a surface of the cathode active material layer is fluorinated, wherein an average working potential of the lithium transition metal oxide having the spinel structure is in the range of about 4.6 V to 4.95 V;

the cathode, anode and separator are wound or folded and housed in the battery case, and the cathode, anode, separator and organic electrolyte are sealed in the battery case with the cap assembly.

* * * * *